United States Patent
Hu et al.

[19]

[11] Patent Number: 6,031,639
[45] Date of Patent: Feb. 29, 2000

[54] APPARATUS FOR SCANNING BOTH OPAQUE TRANSPARENT ORIGINALS

[75] Inventors: Darwin Hu, San Jose; Lawrence Huang, Fremont; Alpha Lan-Chung Hou, Jan Jose, all of Calif.

[73] Assignee: Microtek Artix Corporation, San Jose, Calif.

[21] Appl. No.: 08/885,301

[22] Filed: Jun. 30, 1997

[51] Int. Cl.[7] .................................................. H04N 1/04
[52] U.S. Cl. .......................... 358/474; 358/487; 358/494
[58] Field of Search ................................... 358/471, 474, 358/487, 494, 496, 497

[56] References Cited

U.S. PATENT DOCUMENTS 5,621,563 4/1997 Brook et al. ............................ 358/497

*Primary Examiner*—Thomas D. Lee
*Attorney, Agent, or Firm*—Roy W. Latham; Douglas W. Clarkson

[57] ABSTRACT

A mechanical, electrical and optical scanning apparatus for producing a digital image of a two-dimensional original object that can be either opaque or transparent. A platform supports a camera with precision zoom/focus control for receiving light energy from the object, and the light is converted into electrical energy in a digital format. Opaque objects are supported separately from transparent objects on a carriage, and a light source is supported pivotly for illuminating these objects during scanning in a different manner.

9 Claims, 7 Drawing Sheets

APPARATUS FOR SCANNING BOTH OPAQUE TRANSPARENT ORIGINALS

FIELD OF THE INVENTION

The present invention, generally, relates to digital scanner apparatus and, more particularly, to a single scanner apparatus for scanning original objects that are both opaque and transparent.

Scanners that are available today generally can handle only opaque originals. Of course some specialized scanners can handle transparencies. The physical configuration of scanner components varies with the type of original.

For example, when scanning an opaque original, light from a high-intensity lamp is directed toward the original, reflected off the original into a camera box where lenses and electronic devices form the scanned image. With a transparent original, light from the lamp passes through the original and into the camera box with out any reflection.

The ultimate quality of any scanned image is limited by the ability of the scanner to resolve minute features in the original object. A computer image from a scanner contains a large number of computer picture elements, or pixels. The more pixels per unit area in the image, the better its resolution and overall image quality.

High resolution scanning provides faithful reproduction of graphic art material, both opaque and transparent. High resolutions mandate tight production tolerances for critical scanner parameters, such as the object-to-image distance, or focus; the speed and linearity of moving platform and color accuracy.

Since opaque and transparent originals require different physical configurations of lamp, original and camera, a unique mechanism must be present in the scanner apparatus to maintain the tight production tolerances when changing back and forth between the opaque and the transparent scanning modes.

Usually, scanning apparatus uses a single physical configuration to scan a piece of two-dimensional artwork, graphics or textual material and produces a corresponding computer image. The computer image is composed of a series of computer picture elements, which can be processed to produce many desirable products, including a two-dimensional reproduction of the original object.

The present invention relates to a scanning apparatus for multiple mode scanning. However, a significant difference, as will become clear as the description proceeds, is that the scanning apparatus of the invention includes moving platforms that carry the original object to be scanned as well as the electronic and optical devices necessary for generating the computer image.

The multiplicity of moving platforms allows a single apparatus to produce scanned images in a multiplicity of production modes. The production modes range from a low resolution mode for high productivity and maximum data throughput to a high resolution mode for maximum pixel resolution and best image quality in the final product.

BACKGROUND OF THE INVENTION

It is not unusual today that the ultimate quality of a scanned image is generally limited by the ability of the scanner to resolve minute features in the original object being scanned. A computer image from a scanner contains a large number of computer picture elements, or pixels. The more pixels per unit area in the image, the better its resolution and overall image quality.

High resolution scanning provides faithful reproduction of graphic art material. High resolutions require tight production tolerances for critical scanner parameters, such as the object-to-image distance, or focus, the speed and linearity of the moving platform and the color accuracy.

Scanners available today are capable of producing images at a single resolution. In other words, today's scanners usually are a compromise between scanning speed and pixel resolution. A scanner today with low pixel resolution can convert an original object to a computer image rapidly, and a scanner with high pixel resolution can convert the same original object but more slowly.

An apparatus for multiple mode scanning is described in detail hereinafter. According to one aspect of the present invention, the apparatus has a main support, a multiple transport carriage assembly, a pivoting lamp assembly and a camera box assembly.

The multiple transport carriage assembly carries the original object to be scanned. The camera box which forms the scanned image carries the pivoting lamp assembly. The main support also encloses an electronics box which contains circuitry used to control the apparatus and to interface the scanned output image to a host computer.

The scanner is fabricated with heavy-duty, generally expensive materials required by the low-tolerance, high-precision scanning requirements. An outer cover encloses the entire apparatus.

The scanning apparatus, described in detail hereinafter, is arranged to handle both opaque and transparent originals that vary in size from standard 35 mm film to large 12×18 inch posters. The apparatus can achieve extremely high scanning resolutions up to 4000 pixels per inch.

Scanner resolution capability is measured in pixels per inch, or ppi. The length dimension, in inches, is measured along a single scan line. The scanning resolution for a personal computer application is approximately 72 pixels per inch, compared with the 4000 pixels per inch for the present invention.

An apparatus according to the present invention, as described in detail hereinafter, contains a unique arrangement of lead screws, pulleys and shafts that control camera box positioning within a 9 micron tolerance for object-to-image distance. Only with such tight tolerances will high resolution scanning according to the present invention provide acceptable results.

Further, the camera box of the disclosed invention contains a number of individual lenses mounted in a turret assembly. Each lens provides a single scanning resolution.

When a user selects a particular resolution for scanning, the turret assembly moves to place the correct lens between the original object and the electro-optical imaging device. Precision bearings and overall construction of the multi-lens turret assembly also achieves the 9 micron tolerance requirement for an acceptable object-to-image distance.

The selected lens focuses the light energy from the original object onto a Charge Coupled Device, or CCD. The CCD is a device for converting optical signals into computer pixels at high ppi resolutions. It is a linear array of photo-detectors accessed like a shift register with voltage output proportional to light level.

In this case, the CCD has 8,000 triads of photodetectors along its 72 centimeter length, giving the CCD an intrinsic resolution of 2,822 ppi in full red, green, blue (RGB) color. The lenses convert the intrinsic 2,822 ppi CCD resolution to the multiple scanner resolutions of 667, 1,000, 2,000, 3,000 and 4,000 ppi.

To achieve extremely high scanning resolutions of up to 4000 pixels per inch, the object-to-image distance must be controlled precisely to maintain optical focus. That is, a scan line on the original object and the corresponding scan line on the electro-optical imaging device must remain parallel to each other within 9 microns at all times during the scanning operation.

OBJECTS AND SUMMARY OF THE INVENTION

Accordingly, it is a principal object of the present invention to provide a single apparatus to produce high quality scanned images from both opaque and transparent originals.

An additional object of the present invention is to provide an apparatus adaptable for multiple mode scanning at a high resolution.

Briefly, a scanning apparatus according to the present invention produces a digital image of a two dimensional original object by combining the motion of two platforms along one dimension of the object to provide both high and low resolution scans at high and low speeds. Further, a pivoting lamp assembly in a scanning apparatus in accordance with the present invention permits the production of both opaque and transparent originals.

DETAILED DESCRIPTION OF THE INVENTION

Main Support

Figure 1:
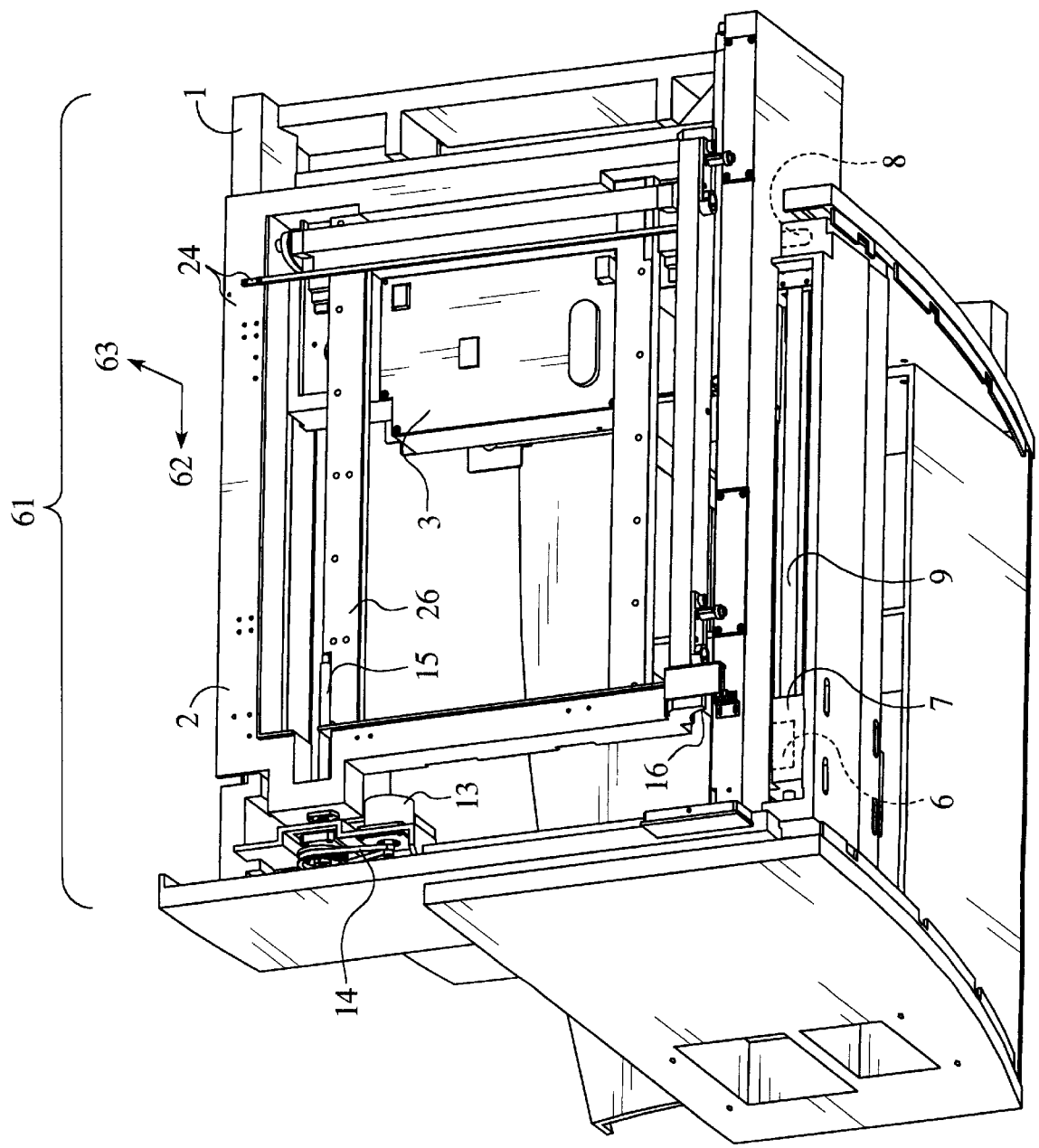
FIG. 1 shows a perspective top view of the preferred embodiment looking from above and behind the unit.
Figure 2:
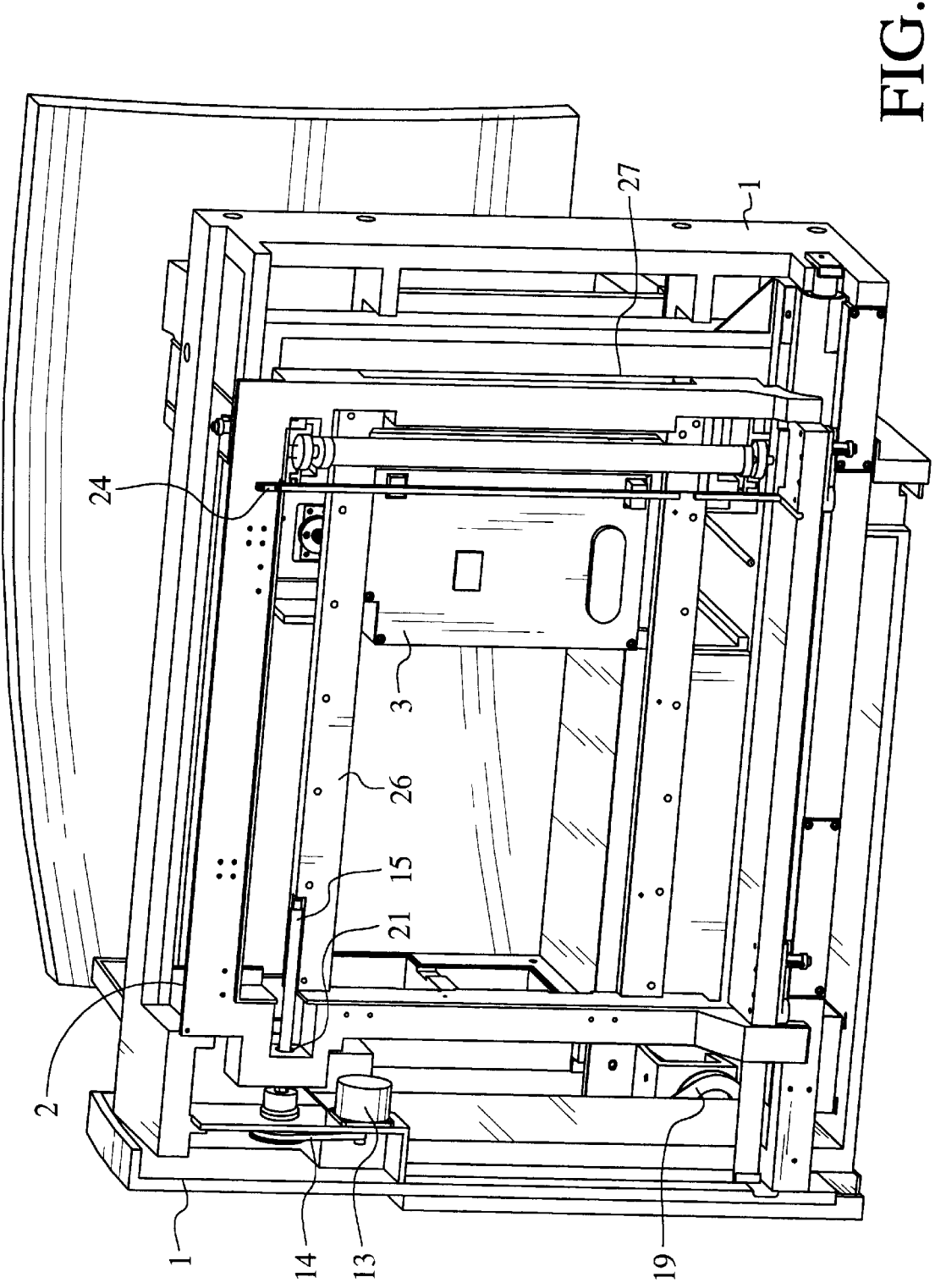
FIG. 2 shows a perspective top view of the preferred embodiment looking from above and in front of the unit.

The main support assembly 1 rests on the floor of a room and provides a generally horizontal, vibration-free flatbed scanning area 61 by means of vibration isolators 19. An electronics box 5 is mounted in the main support assembly 1.

Fine Carriage

A linear slide 16 and a high precision, zero-backlash, generally horizontal ball screw 15 connects the main support assembly 1 to a fine carriage assembly 2 and provide one degree-of-freedom translational motion in the generally horizontal scanning direction 62.

The original object to be scanned rides on the fine carriage assembly 2. For high resolution scanning, a fine carriage stepping motor 13 and timing belt 14 turn the ball screw 15 which, in turn, moves the fine carriage assembly 2 by means of a ball screw bushing 21.

The fine carriage assembly 2 transports the original object past a fluorescent lamp 37 and optical equipment in a camera box assembly 4 to form the scanned output image. Translation of the fine carriage assembly 2 is very precise, with one step of the stepping motor 13 corresponding to $1/12,000$ inch movement in the direction of scan 62.

Length of travel for the ball screw 15 is approximately 5 inches, allowing the fine carriage assembly 2 to travel roughly that distance during scanning operation. Original objects to be scanned are affixed to the fine carriage assembly 2. In the case of an opaque original, it is held place by tape.

In the case of a transparent original, it must first be loaded into a film transparency holder 25, which is separate from the main scanner apparatus. The film transparency holder 25, with the transparent original, is placed through a film transparency holder slot 27 and into the fine carriage assembly 2.

Main Carriage

As stated, the fine carriage assembly 2 provides low-speed, high-resolution scanning. Conversely, the main carriage assembly 3 provides high-speed, low-resolution scanning.

The main carriage assembly 3 is connected to the main support 1 by means of a linear slide 11 which provides one degree-of-freedom motion in the direction of scan 62. A main carriage stepping motor 6, gear box 7, idler pulley 8, timing belt 9 and timing belt rack 10 drive the main carriage through the full 18 inch maximum dimension, so that the entire original object may be scanned.

There is also a set of safety stops 42 to limit travel of the main carriage in the event of a system malfunction. Movement of the main carriage assembly 3 is coarser than the movement of the fine carriage assembly 2. Whereas the fine carriage assembly 2 moves $1/12,000$ inch with each step of its stepping motor 13, the main carriage assembly 3 moves $1/2,000$ inch with each step of its stepping motor 6.

Precise positioning of both carriages, therefore, is obtained by counting respective steps from the start-of-scan position. However, careful attention is paid to controlling the movement of the main carriage assembly 3, so that at rest it is always positioned in increments of one full step (i.e., $1/2,000$ inch).

This is accomplished by a ramp-up, ramp-down control of the main carriage stepping motor 6. With the main carriage positioned precisely at a full step position, it is possible for the fine carriage assembly 2 to scan the entire image by a complementary indexing motion with the main carriage assembly 3.

Figure 3:
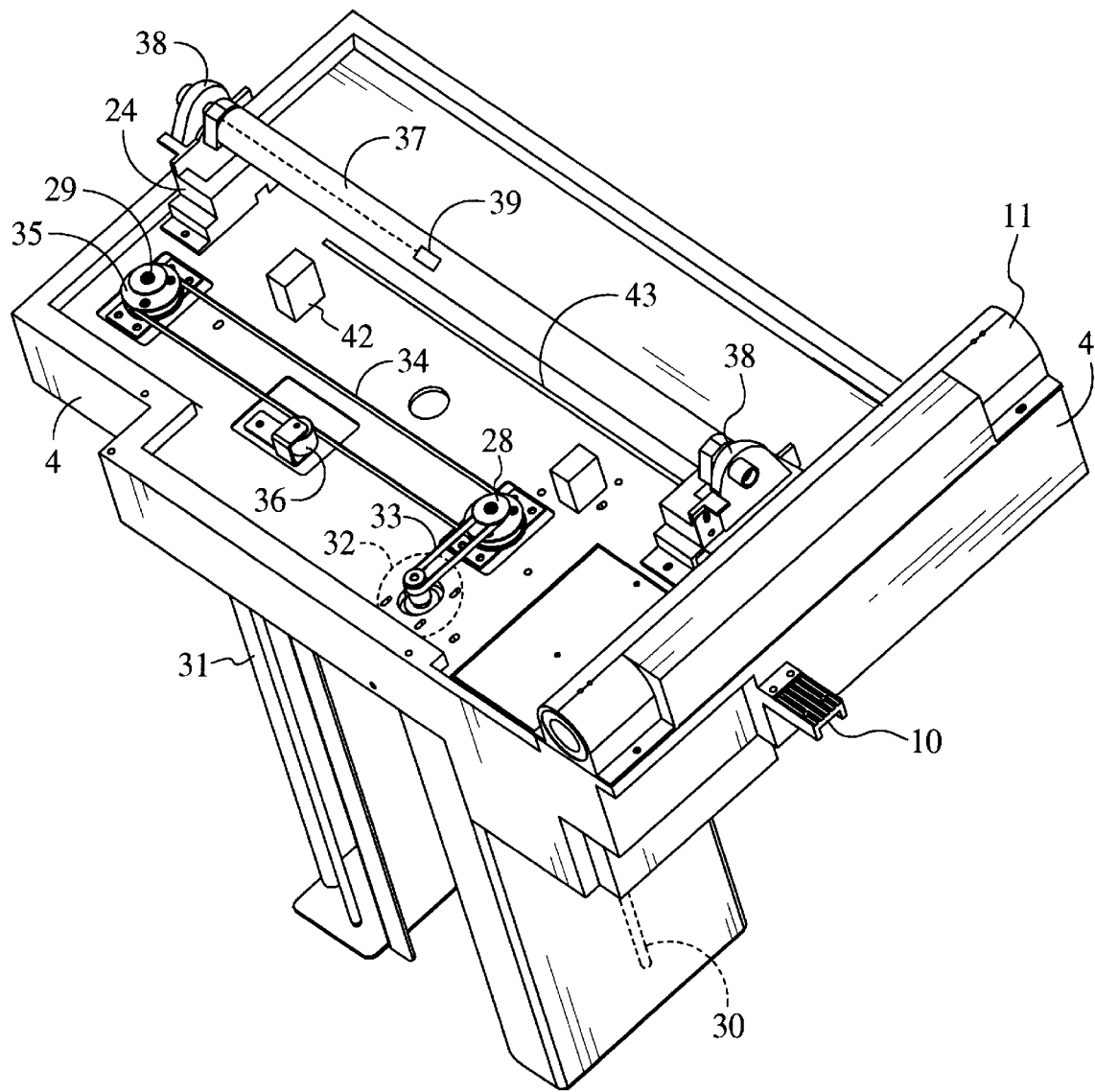
FIG. 3 shows a perspective view of the main carriage.
Figure 4:
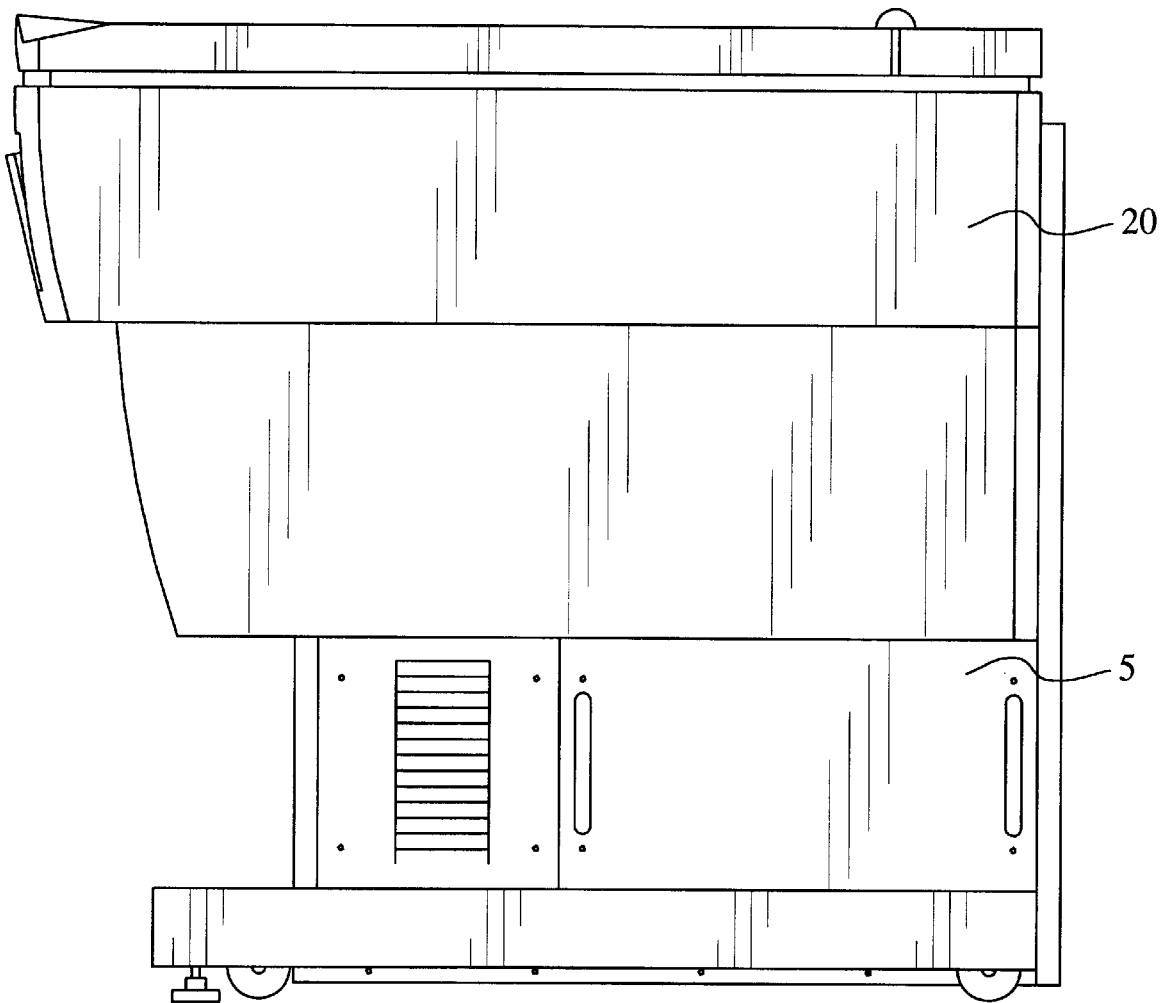
FIG. 4 shows the right side view.
Figure 5:
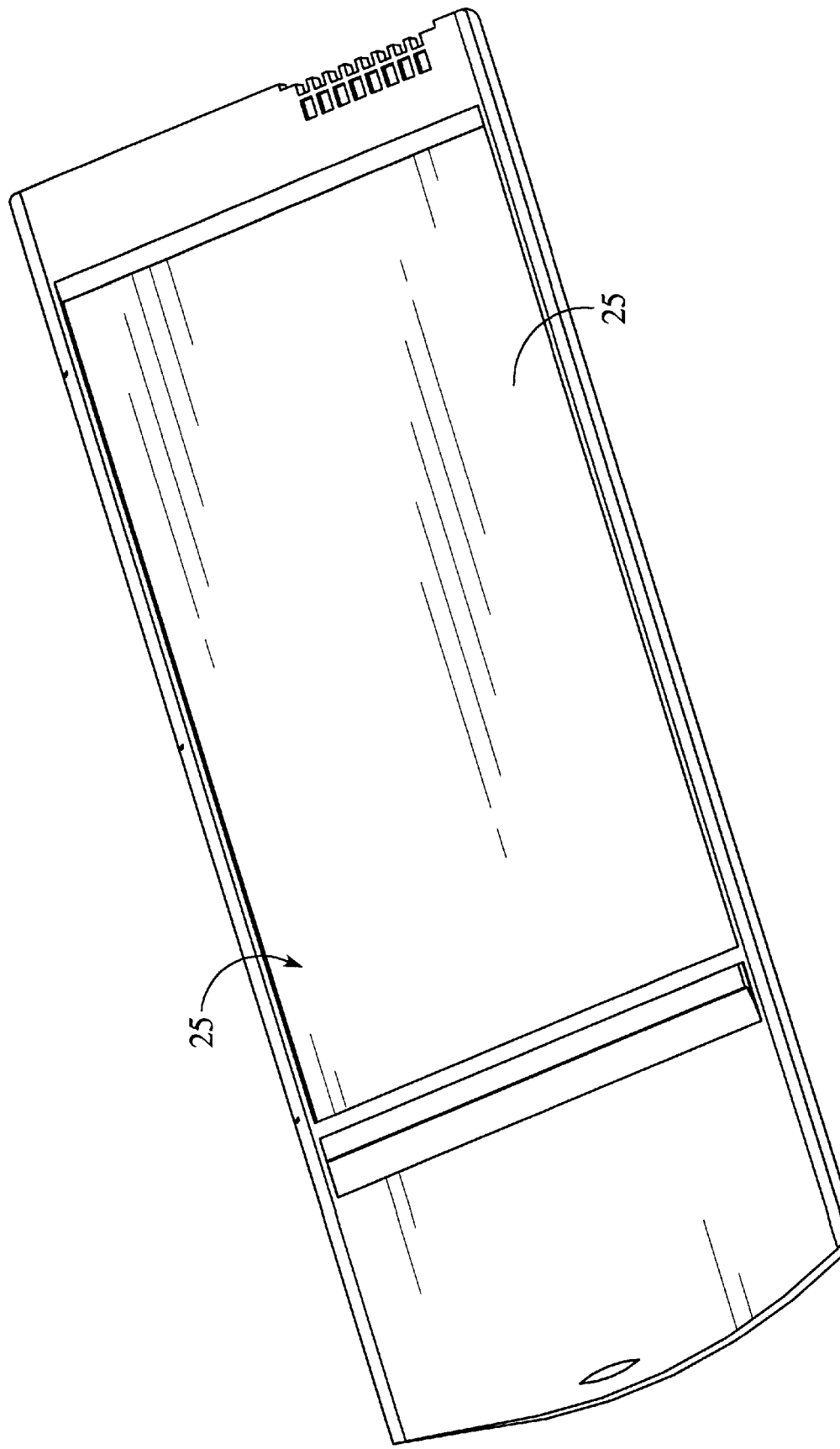
FIG. 5 is a perspective view of a component of the invention.
Figure 6:
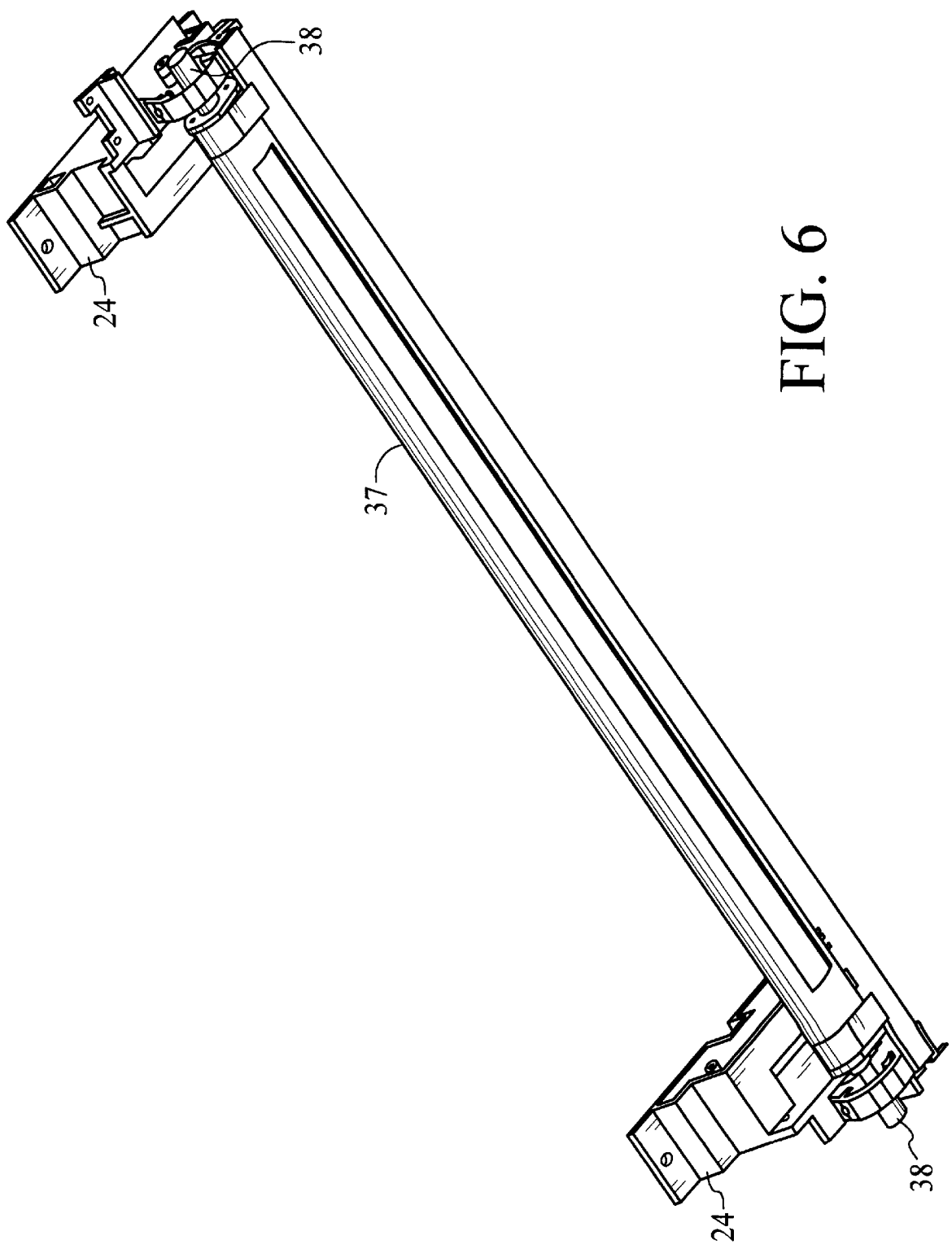
FIG. 6 shows the fluorescent lamp and its associated mounting hardware.
Figure 7:
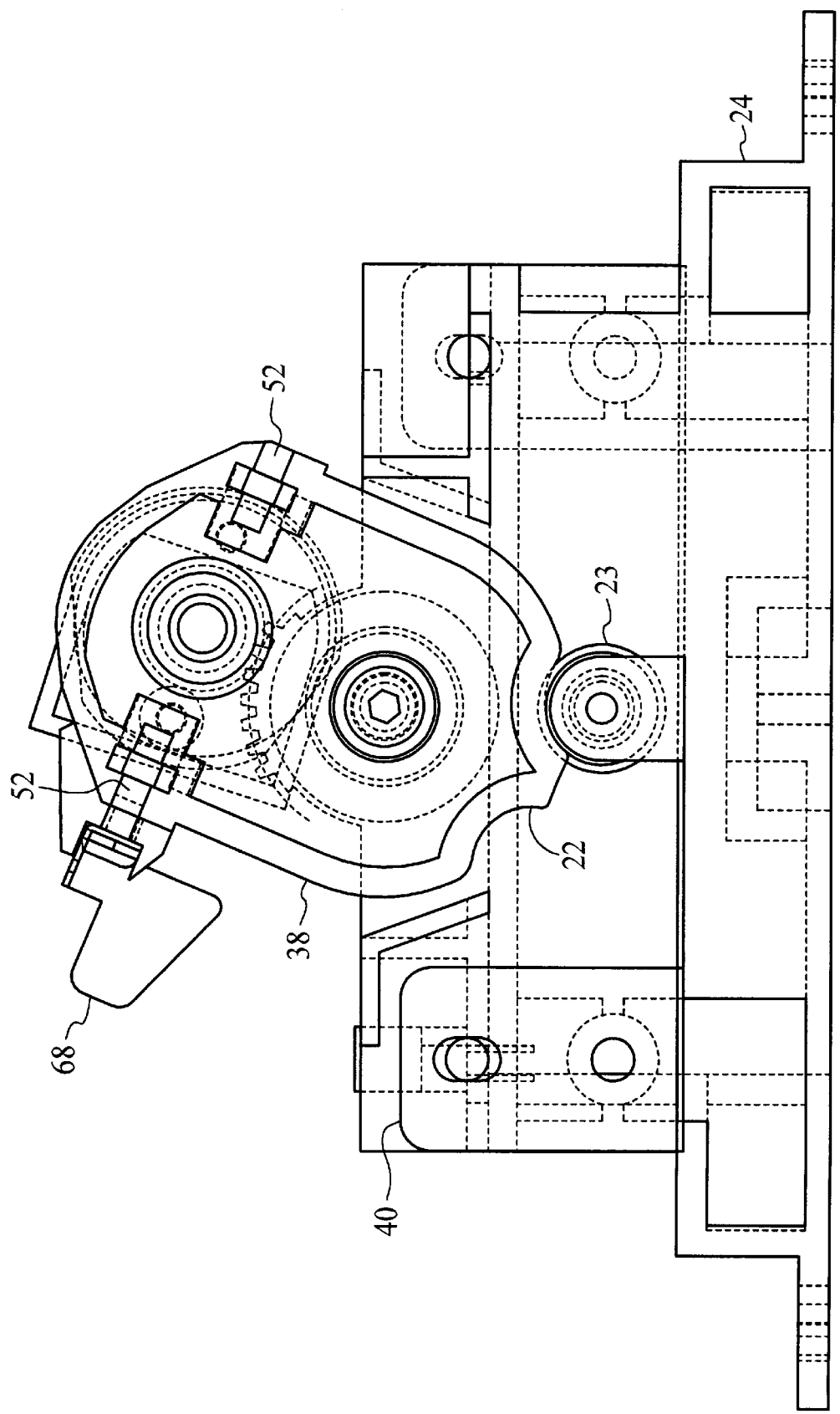
FIG. 7 is a view in perspective showing the fluorescent lamp mounting hardware according to the present invention.

The main carriage assembly 3 carries the fluorescent lamp 37 with aperture as the source of light for scanning. A lamp intensity sensor 39, in FIG. 3, mounted near the lamp 37, measures the light output. Light output measurements from the lamp intensity sensor 39 indicate when the lamp is growing dim and must be changed.

Further, these same light intensity measurements are used in a firmware feedback loop to control instantaneous lamp output. Such intensity control is necessary for precision scanning, especially when the original object is in color, instead of black-and-white. The output color spectrum of the lamp 37 is controlled also by firmware to account for variations in color sensitivities.

A fluorescent lamp 37 is held in place by two lamp pivots 38. The lamp pivots 38 serve to point the aperture of the fluorescent lamp 37 in a direction that is appropriate for transparent or opaque scanning. For opaque originals, this direction is approximately 45 degrees relative to the generally vertical zoom/focus direction 63. Thus, light from the lamp is reflected off the opaque surface and away from the lamp 37 itself.

For transparent originals, the aperture is aligned to the zoom/focus direction 63. In this case, light from the lamp passes directly through the original object.

These two pointing directions can be adjusted by means of lamp pointing adjustment screws 52. Motion of the main carriage assembly 3 causes the lamp pivot actuators 41 to point the fluorescent lamp 37 aperture in the direction appropriate for the type of scanning: opaque or transparent.

The lamp pivot actuators 41 push the lamp pivot 38 so it will index from opaque to transparent positions and return under the control of U-shaped detentes 22 and a spring-loaded roller 23. The entire mechanism is supported by two lamp brackets 24 which fasten to the main carriage assembly 3.

A lamp pivot sensor 40 reports the current position of the lamp pivots 38 to firmware within the electronics box 5 by means of a lamp pivot sensor tab 68.

Camera Box

In addition to the lamp 37, the main carriage assembly 3 also carries the camera box assembly 4. The camera box assembly 4 contains the necessary lenses, control circuitry and the CCD which form the output image. It is necessary to control the distance between the original object and the CCD inside the camera box assembly 4 to within 9 microns.

Outside this tolerance optical focus is lost and, in turn, so is high resolution. Focus must be maintained along the entire length of the scan line, that is, along the length of the original object perpendicular to the scan direction 62 and along the length of the CCD.

The required object-to-image distance is not a fixed distance but changes with the type of object to be scanned, i.e., opaque or transparent, with the selected scanner resolution and for each individual scanner manufactured. The required object-to-image distance changes with the type of object to be scanned since the physical configuration of fluorescent lamp 37, the object to be scanned, film transparency holder 25 and the CCD is different for opaque originals compared to transparent originals.

The required object-to-image distance also changes with scanning resolution because each resolution uses a different lens, and each lens is optimized for a particular object-to-image distance. The required object-to-image distance also changes with each individual scanner manufactured, since production tolerances on the lenses vary within a few millimeters from lens to lens. Correct values for all of the required object-to-image distances are loaded into the scanner's firmware in the electronics box 5.

The variable object-to-image distances are handled on the main carriage assembly 3 by the guide lead screw 28, by idler lead screw 29, by guide shaft 30 and by idler shaft 31. This arrangement of lead screws and shafts permits the camera box assembly 4 to be moved upward and downward in the generally vertical zoom/focus direction 63.

It is understood that the foregoing description is only illustrative of a presently preferred embodiment of the invention. Various alterations and modifications can be devised by those skilled in the art without departing from the spirit and scope of the invention which is defined by the claims appended hereto.

What is claimed is:

1. A scanning apparatus for producing two dimensional computer images of two dimensional, opaque and transparent, original objects comprising:

at least first and second platforms both supported for linear scanning motion alone a predetermined path determined by at least one dimension of said original object;

said first platform carrying said original object and said second platform carrying electro-optical image reproduction means;

first and second scan motive means for moving said first and second platforms along said path;

one of said scan motive means moving one of said platforms over the entire length of said path;

the other of said scan motive means moving the other of said platforms over a fractional part of said path;

means for controlling the motion of said first and second scan motive means to maintain optical focus within predetermined limits; and said means for controlling the motion includes high resolution control means to control said first and second scan motive means in a manner to produce high resolution scanning over the entire length of said path, low resolution motion control means for controlling second scan motive means in a manner to produce low resolution scanning over the entire length of said path, and motion selection means for controlling said first and second scan motive means to produce intermediate scanning resolutions between said high resolution scanning and said low resolution scanning.

2. The scanning apparatus of claim 2 wherein said electro-optical image reproduction means includes pivotable lamp means, camera means, and at least two lenses for focusing light from said original object.

3. A scanning apparatus for producing two dimensional computer images of two dimensional, opaque and transparent, original objects comprising:

at least first and second platforms both supported for linear scanning motion along a predetermined path determined by at least one dimension of said original object;

said first platform carrying said original object and said second platform carrying electro-optical image reproduction means;

first and second scan motive means for moving said first and second platforms along said path;

one of said scan motive means moving one of said platforms over the entire length of said path;

the other of said scan motive means moving the other of said platforms over a fractional part of said path;

means for controlling the motion of said first and second scan motive means to maintain optical focus within predetermined limits; and said first scan motive means includes high resolution motor means and high resolution transmission means coupled to said first platform; and said second scan motive means includes low resolution motor means and low resolution transmission means coupled to said second platform.

4. The scanning apparatus of claim 3 wherein said electro-optical image reproduction means includes pivotable lamp means, camera means, and at least two lenses for focusing light from said original object.

5. A scanning apparatus for producing two dimensional computer images of two dimensional, opaque and transparent, original objects comprising:

at least first and second platforms both supported for linear scanning motion along a predetermined path determined by at least one dimension of said original object;

said first platform carrying said original object and said second platform carrying electro-optical image reproduction means;

said electo-optical image reproduction means comprises:

pivotable lamp means for producing light energy for illuminating said original object;

camera means for receiving said light energy along the other of said object dimensions and converting it into electrical energy in digital format using a charge coupled device;

a multiplicity of lenses for focusing said light energy from said original object onto said charge coupled device;

lens selection means for selecting one of said lenses to achieve predetermined high, low and intermediate resolutions;

zoom/focus motive means to maintain precisely a substantially parallel distance between said original object and said charge coupled device;

first and second scan motive means for moving said first and second platforms along said path;

one of said scan motive means moving one of said platforms over the entire length of said path;

the other of said scan motive means moving the other of said platforms over a fractional part of said path;

motion control means for controlling said first and second scan motive means.

6. The scanning apparatus of claim 5 wherein said parallel distance is maintained within 9 microns.

7. The scanning apparatus of claim 6 wherein said focus control means includes first and second lead screws, and first and second guide shafts; with said lead screws coupled to said zoom/focus stepper motor by a non-slip belt.

8. The scanning apparatus of claim 5 wherein said zoom/focus motive means includes a zoom/focus stepper motor; and focus control means coupled to said camera means.

9. The scanning apparatus of claim 5 wherein said scan motive means and said zoom/focus motive means operate together to produce said computer image under control of digital electronics.

* * * * *